US010229367B2

(12) United States Patent
Drew (10) Patent No.: US 10,229,367 B2
(45) Date of Patent: Mar. 12, 2019

(54) COLLABORATIVE ANALYTICS MAP REDUCTION CLASSIFICATION LEARNING SYSTEMS AND METHODS

(71) Applicant: Jacob Drew, Canton, TX (US)

(72) Inventor: Jacob Drew, Canton, TX (US)

(*) Notice: Subject to any disclaimer, the term of this patent is extended or adjusted under 35 U.S.C. 154(b) by 941 days.

(21) Appl. No.: 14/169,689

(22) Filed: Jan. 31, 2014

(65) Prior Publication Data

US 2014/0222736 A1 Aug. 7, 2014

Related U.S. Application Data

(60) Provisional application No. 61/761,523, filed on Feb. 6, 2013, provisional application No. 61/781,356, filed on Mar. 14, 2013.

(51) Int. Cl.
*G06N 99/00* (2010.01)
*G06F 9/50* (2006.01)

(52) U.S. Cl.
CPC ......... *G06N 99/005* (2013.01); *G06F 9/5066* (2013.01)

(58) Field of Classification Search
None
See application file for complete search history.

(56) References Cited

U.S. PATENT DOCUMENTS 8,135,718 B1 * 3/2012 Das .................. G06F 17/30979
707/748
8,725,663 B1 * 5/2014 Triantaphyllou .... G06N 99/005
706/12

(Continued)

OTHER PUBLICATIONS

Zhao, Weizhong, Huifang Ma, and Qing He. "Parallel k-means clustering based on mapreduce." Cloud Computing. Springer Berlin Heidelberg, 2009. 674-679.*

(Continued)

*Primary Examiner* — Stanley K. Hill
(74) *Attorney, Agent, or Firm* — James H. Ortega; Carstens & Cahoon, LLP (57) ABSTRACT

Disclosed herein are systems and methods for data learning and classification for rapidly processing extremely large volumes of input data using one or more computing devices, that are application and platform independent, participating in a distributed parallel processing environment. In one embodiments, a system may comprise a plurality of parallel Map Reduction Aggregation Processors operating on the one or more computing devices, and configured to receive different sets of input data for data aggregation. Each of the Map Reduction Aggregation Processors may comprise one or more parallel Mapping Operation Modules configured to consistently dissect the input data into individual intermediate units of mapping outputs comprising consistently mapped data keys, and any values related to mapped data keys, conducive to simultaneous parallel reduction processing; and one or more parallel Reduction Operation Modules configured to continually and simultaneously consume the mapping outputs by eliminating the matching keys and aggregating values consistent with a specified reduction operation for all matching keys that are encountered during consumption of the mapping outputs. The system may also include an application-specific Classification Metric Function Operations Module operating on the one or more computing devices and configured to receive reduction outputs from the Reduction Operations Modules to determine distance and/or similarity between each of the different sets of input data with respect to one or more data classification categories using one or more distance and/or similarity calculations.

20 Claims, 5 Drawing Sheets

(56) References Cited

U.S. PATENT DOCUMENTS

| | | | | |
|---|---|---|---|---|
| 8,832,105 | B2* | 9/2014 | Punera | G06F 17/3071 707/737 |
| 9,275,143 | B2* | 3/2016 | Pugh | G06F 17/3071 |
| 2007/0038659 | A1* | 2/2007 | Datar | G06Q 30/02 |
| 2010/0223244 | A1* | 9/2010 | Sinha | G06Q 10/00 707/705 |
| 2011/0029477 | A1* | 2/2011 | Tengli | G06F 17/30495 706/54 |
| 2011/0119268 | A1* | 5/2011 | Rajaram | G06F 17/30887 707/737 |
| 2013/0151531 | A1* | 6/2013 | Li | G06F 17/30734 707/740 |
| 2014/0047422 | A1* | 2/2014 | Ravi | G06F 8/443 717/151 |
| 2014/0143251 | A1* | 5/2014 | Wang | G06F 17/30598 707/737 |
| 2015/0039538 | A1* | 2/2015 | Hefeeda | G06K 9/6282 706/12 |
| 2017/0228446 | A1* | 8/2017 | Sinha | G06F 17/3053 |

OTHER PUBLICATIONS

Nasullah Khalid Alham, Maozhen Li, Yang Liu, Suhel Hammoud, A MapReduce-based distributed SVM algorithm for automatic image annotation, Computers & Mathematics with Applications, vol. 62, Issue 7, Oct. 2011, pp. 2801-2811.*

Zhao, Bin, Fei Li, and Eric P. Xing. "Large-scale category structure aware image categorization." Advances in Neural Information Processing Systems. 2011.*

He, Qing, et al. "Parallel implementation of classification algorithms based on MapReduce." International Conference on Rough Sets and Knowledge Technology. Springer Berlin Heidelberg, 2010.*

Rares, Vernica et al.; "Efficient Parallel Set-Similarity Joins Using MapReduce"; 2010; ACM; SIGMOD'10; pp. 495-506. (Year: 2010).*

Gao, Hui et al.; "A New Agglomerative Hierarchical Clustering Algorithm Implementation based on the Map Reduce Framework"; International Journal of Digital Content Technology and its Applications, vol. 4, No. 3, Jun. 2010; pp. 95-100. (Year: 2010).*

* cited by examiner

Figure 5 ns and Methods.

COLLABORATIVE ANALYTICS MAP REDUCTION CLASSIFICATION LEARNING SYSTEMS AND METHODS

PRIORITY CLAIM

The present disclosure is a non-provisional conversion of, and thus claims priority to, U.S. Provisional Patent Application No. 61/761,523, filed Feb. 6, 2013, and U.S. Provisional Patent Application No. 61/781,356, filed Mar. 14, 2013, both of which are incorporated herein in their entireties for all purposes.

TECHNICAL FIELD

The present invention relates in general to the field of parallel data processing, and more particularly to machine learning and classification of extremely large volumes of both structured and unstructured data using Collaborative Analytics Map Reduction Classification Learning Systems and Methods.

BACKGROUND

Machine learning and classification involves the extraction of structured or unstructured targeted raw data from various data sources and transforming the targeted raw data into a format suitable for performing subsequent learning and/or classification processing on. During machine learning, descriptive patterns within the target data are collected and documented using a consistently applied aggregation method, which typically collects descriptive statistical facts about data of known categories or classification origins. When data of unknown categories or classification origins are used as data input, the consistently applied aggregation method can be used to identify descriptive patterns within the unknown data for comparison and classification against all data of known classification types and origins within the current system.

A parallel data processing implementation for the purposes of machine learning and classification typically comprises the distribution of targeted raw data and a consistently applied aggregation method across multiple processors and disks to perform simultaneous computations, while taking advantage of increased memory, reduced i/o, and the combined processing power of all participating computing devices.

Several systems and programming languages, such as the R Project for Statistical Computing, include programming features for the learning and classification of data. However, current solutions do not provide the functionality to automatically distribute learning and classification processes across multiple processors and disks in a distributed parallel computing environment using a map reduction aggregation method. Furthermore, current learning and classification systems implement a rigid framework which typically requires the use of a single predefined aggregation method and classification metric function. These limitations often result in extensive and sometimes very overhead intensive input data pre-processing in order to transform the targeted data for use within the rigid framework. Furthermore, the rigid framework typically does not support multiple application specific map reduction aggregation methods and classification metric functions created by the application programmer.

SUMMARY

In accordance with one aspect of the present invention, a Collaborative Analytics Map Reduction Classification Learning System and Method are provided which substantially eliminates or reduces disadvantages associated with previous machine learning and classification systems.

According to one embodiment, a Collaborative Analytics Map Reduction Classification Learning System and Method are provided for the rapid parallel processing, learning, and classification of extremely large volumes of both structured and unstructured data, which allows programmers to create and deploy application specific map reduction aggregation methods and classification metric functions. The map reduction methods specify how targeted input data will be aggregated within the current system. Targeted input data is consistently dissected by the mapping processes into individual, independent units of intermediate work typically comprising consistently mapped data keys and values that are conducive to simultaneous parallel reduction processing. The reduction methods continually and simultaneously aggregate or reduce the mapped data keys and values by eliminating the matching keys and aggregating values consistent with the reduction operations for all matching keys which are encountered during map reduction processing.

In some embodiments, only keys are required during map and/or reduction processing since the value for each encountered key is always assumed to be equal to 1, or a reduction value can be calculated using only the key itself. However, in other embodiments, a value field may be necessary to maintain how many times a unique key occurred, a frequency value weighted by the key length, an aggregated series of value transformations based on a particular key's general importance within a given system, or for capturing any other value modification functions consistent with any number of application specific map reduction aggregation methods. Occasionally, longer Keys can also be successfully hashed to reduce memory and increase processing speed within a given system.

Certain embodiments of the invention may also implement multiple stages of mapping and/or reduction to facilitate increased parallelism, produce final mapping and/or reduction values, or to fulfill other requirements of specific map reduction method implementations. Once a particular map reduction method has been provided to a Collaborative Analytics Map Reduction Classification Learning System and utilized within the system for learning input data of known categories or classification origins, the same map reduction method is also available for use to aggregate input data of unknown categories or classification origins for the purposes of classification processing.

In some embodiments, map reduction output of known categories or classification origins may be consolidated or further reduced by storing all outputs using similar map reduction methods in a single collection of nested key value pairs where the key for each key-value pair maps to a second or nested collection of "categorical" key-value pairs as its value. The collection of "categorical" key-value pairs for each key provides a numerical description of that key across any number of categorical keys contained in the nested "categorical" key-value pair collection. This numerical description is typically created by the reduction method, and the number of nested categorical key-value pair entries can also vary between the individual mapped entries within the entire collection. Likewise, any corpora of input data collections containing unknown categories or classification origins could also be map reduced into a single nested "categorical" key-value pair collection for the purpose of performing a combined classification or otherwise.

Certain embodiments of the invention may also include one or more classification metric functions to calculate the distance or similarity between two resulting map reduction outputs. Classification and/or learning map reduction outputs are provided to the classification metric function where one or more classification metric similarities or distances are calculated using the items in each individual map reduction output. When a nested categorical key pair value data structure is used to consolidate multiple map reduction outputs, classification metric similarities or distances can be calculated for a single category or plurality of categories represented within the entire consolidated map reduction output.

Embodiments using distance or similarity metrics that only require the determination of the intersection and union between two sets, such as Jaccard Similarity or Distance, may only require the use of map reduction output keys during classification metric function calculations. However, the same embodiment could still maintain both map reduction output keys and values within a map reduction output collection for flexibility of use and in order to accommodate multiple distance or similarity metric calculations. For instance, a Cosine similarity or distance metric which uses a vector of frequencies created from the map reduction output values could also be supported within such a system. Furthermore, other distance or similarity metrics could be used which require both the keys and values produced by the map reduction processes. In one such embodiment, the length of each key could be used to weight each value when longer matching keys are considered to be more valuable matches than shorter ones. Another variation could reference each key within a lookup table to determine a predefined key weighting used during value transformations.

Particular embodiments of the invention for the rapid processing of extremely large volumes of input data can include a plurality of map reduction workers which are coupled to individual processors on one or more computing devices participating in a distributed parallel processing environment. While map workers are performing mapping operations, transitional mapping outputs are placed into centralized storage areas accessible to reduction operation workers. Simultaneously, reduction operation workers are consuming the transitional mapping output, reducing the keys, and integrating the values consistent with the specified reduction operations.

In some embodiments, map reduction operations could include the consolidation of map reduction outputs using similar map reduction methods into a collection of key value pairs where each key maps to a nested "categorical" key-value pair collection in which the nested key-value pair values are statistically representative of a particular category key associated with the categorical key value pair collection's key. Any number of collections could be coupled to various map reduction workers implemented on different processors. Collections could also be sharded or partitioned across any number of devices accessible to multiple map reduction workers connected to a distributed network.

Certain embodiments include classification metric functions which occur in tandem to map and reduction operations. While map workers are performing mapping specific operations, transitional mapping outputs are placed into centralized storage areas accessible to reduction operation workers. Simultaneously, reduction operation workers are consuming the transitional mapping output, reducing the keys, and integrating the values consistent with the specified reduction operations. Transitional classification metric inputs are placed by the reduction workers into centralized storage areas accessible to a plurality of classification metric workers. These workers consume the classification metric inputs performing one or more distance and/or similarity calculations concordant with the specified Classification Metric Function Operations Module. It is preferable to automatically run map, reduce, map reduction output consolidation, and classification metric functions in parallel using self-contained methods controlling parallel processing that are application and platform independent.

In some embodiments, a blocking mechanism may be used for at least one transitional output storage area. The blocking mechanism manages the potential differences in the production and consumption speeds between mapping, reduction, and classification metric operations. In this type of embodiment the transitional blocking mechanism is notified that transitional output production has started. Production workers produce transitional outputs while consumption workers consume the transitional outputs until the blocking mechanism is notified by the production process that production of all transitional outputs has completed. Consumption workers also continue working until production has completed and all transitional outputs have been consumed. In the event that there are no transitional outputs to consume and production has not completed, the blocking mechanism allows consumers to "block" or wait until additional transitional outputs are produced. Memory consumption can also be managed within the blocking mechanism by setting a pre-determined production capacity. When the production capacity is exceeded, the blocking mechanism allows production workers to stop production and "block" or wait until additional transitional outputs are consumed and the transitional output count falls back below the pre-determined production capacity. Any Collaborative Analytics Map Reduction Classification Learning System process creating transitional outputs including map methods, reduction methods, and classification metric functions could act as producers and/or consumers interacting with multiple blocking mechanisms participating in multiple production and consumption relationships.

According to one embodiment, a locality sensitive hashing engine is employed to drastically reduce the amount of storage required for high capacity Collaborative Analytics Map Reduction Classification Learning Systems. During a stage 1 map reduction aggregation method, transitional reduction outputs are placed into centralized storage areas accessible to locality sensitive hashing operation workers. A pre-determined number of distinct hash functions are then used to hash each unique reduction transitional output key produced during the stage 1 map reduction aggregation method one time each. As reduction transitional output keys are repeatedly hashed, only one minimum resulting hash value for each of the distinct hash functions are retained across all keys. When the process is completed only one minimum hash value for each of the distinct hash functions remains in a collection of MinHash values which represent the unique characteristics of the learning or classification input data. During a stage 2 map reduction aggregation method MinHash collections may also be consolidated or further reduced by storing all outputs using similar map reduction methods in collections of nested key value pairs where the key for each key-value pair maps to a second or nested collection of "categorical" key-value pairs as its value. Collections of nested key value pairs can be partitioned or sharded by each distinct hash function when distinct hash functions are assigned a distinct hash function id. The collection of "categorical" key-value pairs for each MinHash key provides a numerical description of each MinHash key across any number of categorical keys contained in the nested "categorical" key-value pair collection.

This numerical description value is typically created by the stage 2 reduction method, and the number of nested categorical key-value pair entries can also vary between the individual MinHash key entries within the entire collection. Likewise, any corpora of input data collections containing unknown categories or classification origins could also be map reduced into a single nested MinHash "categorical" key-value pair collection for the purpose of a performing a combined MinHash classification or otherwise. In other embodiments, locality sensitive hashing could be performed using a variety of different approaches in place of the MinHash method, or alterations of the MinHash method could be performed using different hash function configurations or different numbers of distinct hash functions. One such alternative would be to create a set of locality sensitive hash families for hamming distance where $$\text{Cosine similarity} = \cos\left(\frac{\text{hamming distance}}{\text{signature length}} * \pi\right)$$

and Cosine Distance=1−Cosine similarity could then be used as a classification metric function. Once MinHash collections have been created, classification metric functions can be applied to calculate similarity or distance measures using any of the aforementioned methods.

Certain embodiments may process input data with no known categories or classification origins during both learning and classification. In these instances a parallel single pass clustering engine (see Provisional App. No. 61/777,055, entitled SINGLE PASS HIERARCHICAL AGGLOMERATIVE CLUSTERING SYSTEMS AND METHODS, which is commonly owned with the present disclosure and incorporated herein by reference) may be implemented to process and cluster transitional distance outputs produced by the classification metric functions. Transitional distance outputs are placed into a centralized interval heap accessible to the classification metric function workers producing each transitional distance output. An interval heap is a specialized collection which efficiently and continually exposes minimum and maximum distance values for removal from the collection. For example, the C5 Generic Collection Library for the C# programming language provides such an interval heap collection object. After all transitional distance outputs are placed into the centralized interval heap, the parallel single pass clustering engine performs efficient Hierarchical Agglomerative Clustering of the transitional distance outputs using the interval heap as its input. The resulting clusters can then be used as the assigned classification categories.

Alternative invention embodiments designed for large scale parallel processing may include multiple computing and/or storage devices interconnected though a network with at least one device receiving input data, one device performing mapping methods, one device performing reduction methods, and one device performing classification metric functions. Any devices in this system containing map workers could perform mapping specific operations placing transitional mapping outputs into centralized storage areas accessible to reduction operation workers. Simultaneously, devices in this system containing reduction operation workers are consuming the transitional mapping output, reducing the keys, and integrating the values consistent with the specified reduction operations. Transitional classification metric inputs are placed by the reduction workers into centralized storage areas accessible to a device or devices containing at least one classification metric worker consuming the classification metric inputs and performing one or more distance and/or similarity calculations concordant with the specified Classification Metric Function Operations Module.

Certain embodiments of the invention may include one or more technical advantages. A technical advantage of the embodiment includes allowing programmers to create and deploy application specific map reduction aggregation methods within a Collaborative Analytics Map Reduction Classification Learning System. Application specific map reduction aggregation methods flexibly support processing both structured and unstructured data in an unlimited number of ways during both learning and classification processing. For example, text documents could be both learned and classified via application specific map reduction aggregation using as aggregation keys: the entire text of documents, sentences, keywords, n-grams, word frequency, the unique occurrence of words, or any other method conceived by the map reduction aggregation method creator. Another technical advantage of an embodiment provides allowing programmers to create and deploy application specific classification metric functions within a Collaborative Analytics Map Reduction Classification Learning System. Application specific classification metric functions flexibly support comparing the similarity or distance (dissimilarity) between application specific map reduction aggregation method outputs of both structured and unstructured data in a myriad of ways during both learning and classification processing. For example, text documents could be compared for similarity and/or distance (dissimilarity) using as a classification metric function: Edit Distance between the entire texts of documents, Jaccard Similarity or Distance between the occurrence of unique words in documents, Cosine Similarity or Distance between vectors using the frequency of the occurrence of sentences, keywords, n-grams, or words in documents, or any other method conceived by the classification metric function creator. Yet another technical advantage of an embodiment provides the rapid learning and classification of input data into one or more known categories or classification origins using the parallel processing of map reduction methods and classification metric functions. The parallel processing of map reduction methods and classification metric functions allows performing multiple stages of learning or classification simultaneously by dividing up learning and classification work into individual independent units which facilitate concurrent and rapid parallel processing during multiple learning and classification stages.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description and the accompanying drawings, in which.

DETAILED DESCRIPTION

Embodiments of the present invention and its advantages are best understood by referring to the following figures, with like numerals being used for like and corresponding parts of the various drawings.

Figure 1:
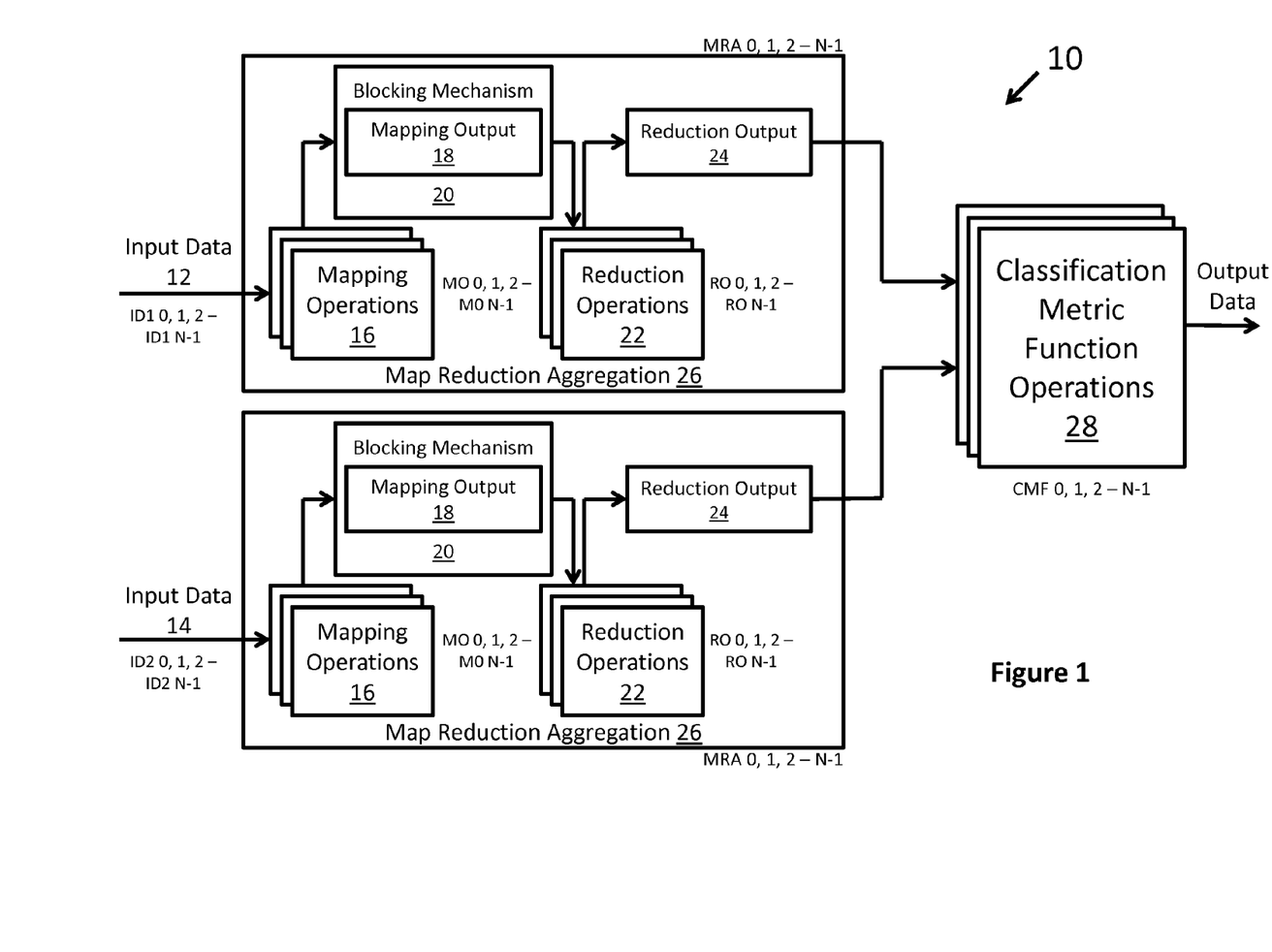
FIG. 1 illustrates a block diagram of a Simple Collaborative Analytics Map Reduction Aggregation and Classification Metric Function Model.

FIG. 1 illustrates a Simple Collaborative Analytics Map Reduction Aggregation and Classification Metric Function Model 10 which applies a consistent map reduction aggregation method to two different sets of input data ID1 0,1,2-ID1 N-1 and ID2 0,1,2-ID2 N-1 and then uses an application specific classification metric function to determine the similarity and/or distance between the two different sets of input data ID1 and ID2.

Model 10 includes one or more application specific Map Reduction Aggregation Processors 26 which use one or more Mapping Operation Modules 16 to consistently dissect the targeted input data into individual, independent units of transitional Mapping Outputs 18 comprising consistently mapped data keys and values that are conducive to simultaneous parallel reduction processing.

A Blocking Mechanism 20 is used to regulate interactions between the transitional Mapping Output 18 producers and consumers. The Mapping Operations 16, or in other embodiments a mapping operations manager program notifies the Blocking Mechanism 20 that mapping transitional output 18 production has begun. The Blocking Mechanism 20 begins releasing the transitional Mapping Outputs 18 to one or more application specific Reduction Operations Modules 22 for processing consistent with the specified reduction operations. If a transitional Mapping Outputs 18 production capacity has been set and subsequently exceeded the Blocking Mechanism 20 will force transitional Mapping Outputs 18 producers, which are in this case the Mapping Operations Modules 16, to "block" or wait until the production capacity falls back below the pre-determined production capacity threshold. If production has not completed and no transitional Mapping Outputs 18 currently exist, the Blocking Mechanism 20 will force transitional Mapping Outputs 18 consumers, which are in this case Reduction Operations Modules 22, to "block" or wait until the Mapping Operations 16 produces more transitional Mapping Outputs 18.

Once the production of transitional Mapping Outputs 18 has completed, the Mapping Operations 16, or in other embodiments a mapping operations manager program notifies the Blocking Mechanism 20 that all transitional Mapping Outputs 18 production is complete. The Blocking Mechanism 20 then allows transitional Mapping Outputs 18 consumers, which are in this case Reduction Operations Modules 22, to complete processing once all transitional Mapping Outputs 18 have been consumed.

System 10 includes one or more application specific Map Reduction Aggregation Processors 26 which use one or more Reduction Operations Modules 22 to continually and simultaneously aggregate and consume the transitional Mapping Outputs 18 eliminating the matching keys and aggregating values consistent with the specified reduction operations for all matching keys which are encountered during the Reduction Operations Modules 22 processing of transitional Mapping Outputs 18.

Sets of input data ID1 0,1,2-ID1 N-1 and ID2 0,1,2-ID2 N-1 are provided to the Map Reduction Aggregation Processors 26. In some embodiments, both sets of input data ID1 and ID2 could be provided together when an input data ID is used to identify each individual input data component. Other embodiments could simultaneously process both sets of input data ID1 and ID2 using separate instances of the Map Reduction Aggregation Processors 26 running in separate processes or threads. Yet another embodiment might process ID1 first and then ID2 separately saving the transitional reduction output results 24 each time.

Once the Map Reduction Aggregation Processors 26 have been performed on both input data sets ID1 and ID2, two separate transitional reduction output results 24 are provided to the Classification Metric Function Operations Module 28. The similarity and/or distance between input data sets ID1 and ID2 are then calculated consistent with the specified classification metric function operation.

Figure 2:
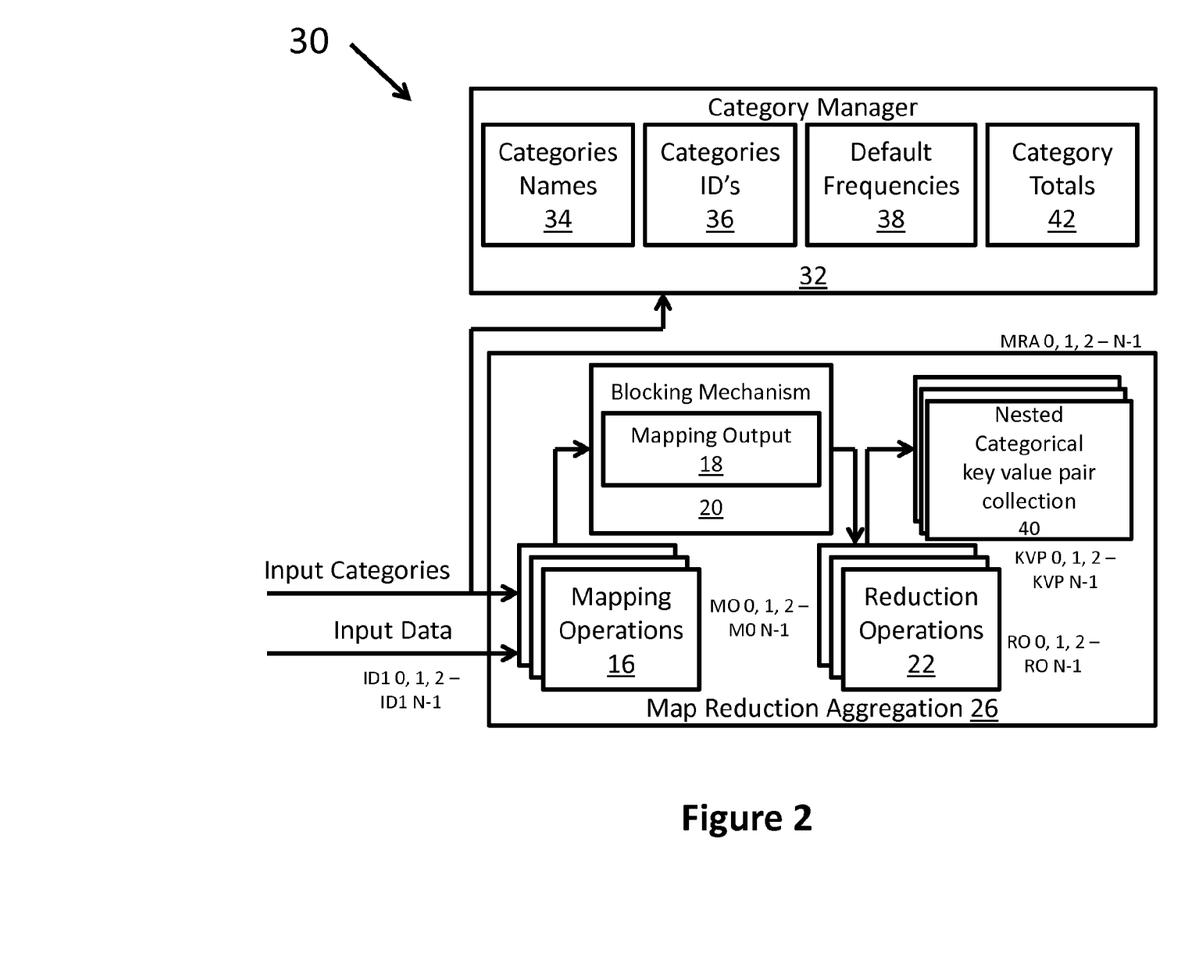
FIG. 2 illustrates a block diagram of a Collaborative Analytics Map Reduction Aggregation Consolidation Model.

FIG. 2 illustrates a Collaborative Analytics Map Reduction Aggregation Consolidation Model 30 that processes input data and input categories ID1 for the primary purposes of learning and associating the input data ID1 with one or more known categories or classification origins contained in the ID1 input categories provided to the system. Certain embodiments could use Collaborative Analytics Map Reduction Aggregation Consolidation for purposes other than learning such as to consolidate a corpora of input data collections containing unknown categories or classification origins for the purpose of performing a combined classification or otherwise. In such instances a Category Manager 32 may or may not be required.

Model 30 includes a Category Manger 32 which manages all known categories or classification origins within the system. The Category Manger 32 comprises a unique list of Category Names 34, a unique list of associated Category IDs 36, a collection of default frequencies 38, and a collection of Category Totals 42. Certain Category Manger 32 embodiments could contain two separate key value pair collections of unique category names and IDs to provide keyed access for quickly identifying a category name associated with a Category ID and vice-versa in the second key value pair collection. The input categories from ID1 are provided to the Category Manger 32. If a category name does not exist in the Category Names 34 collection, the Category Manger 32 adds the new category name to the Category Names 34 collection and associates a unique Category ID with the category name in the Category IDs collection 36. In such embodiments, Category ID values are used instead of category name values in the Nested Categorical Key Value Pair Collection 40 to reduce memory consumption and enhance performance.

In the model 30 embodiment, one or more application specific Map Reduction Aggregation Processors 26 use one or more Mapping Operation Modules 16 to consistently dissect the targeted input data into individual, independent units of transitional Mapping Outputs 18 comprising consistently mapped data keys and values that are conducive to simultaneous parallel reduction processing. A Blocking Mechanism 20 is used to regulate interactions between the transitional Mapping Output 18 producers and consumers as described in FIG. 1 above. The application specific Map Reduction Aggregation Processors 26 use one or more Reduction Operations Modules 22 to continually and simultaneously aggregate and consume the transitional Mapping Outputs 18 eliminating the matching keys and aggregating values consistent with the specified reduction operations for all matching keys which are encountered during the Reduction Operations Modules 22 processing of transitional Mapping Outputs 18.

During consolidation the Reduction Operations Modules 22 outputs are consolidated into the Nested Categorical Key Value Pair Collection 40 that contains all outputs using similar map reduction methods in a single collection of nested key value pairs where the key for each key-value pair maps to a second or nested collection of "categorical" key-value pairs as its value. The collection of "categorical" key-value pairs for each key provides a numerical description of that key across any number of categorical keys contained in the nested "categorical" key-value pair collection. This numerical description is typically created by the reduction method, and the number of nested categorical key-value pair entries can also vary between the individual mapped entries within the entire collection.

In some embodiments, the Category Manger 32 also manages a collection of default frequencies 38 which can be used as a frequency collection template in the Nested Categorical Key Value Pair Collection 40. When new or unknown keys are encountered in the Reduction Operations Modules 22 outputs during map reduction aggregation consolidation, the default frequencies 38 collection is accessed and a copy of the correct default frequencies provided for the specific input text being processed is made and used as the starting Nested Categorical Key Value Pair Collection (or value) in the new nested key value pair entry. When the Reduction Operations Modules 22 outputs contain keys that currently exist in the Nested Categorical Key Value Pair Collection 40, each of the nested category values within the nested category collection are typically incremented or modified consistent with the specified reduction operation of the Reduction Operations Modules 22. Representative totals for each category are maintained in the Category Totals 42 collection. These totals could be updated as each of the Reduction Operations Modules 22 occur or could be updated in bulk after Reduction Operations Modules 22 complete.

Figure 3:
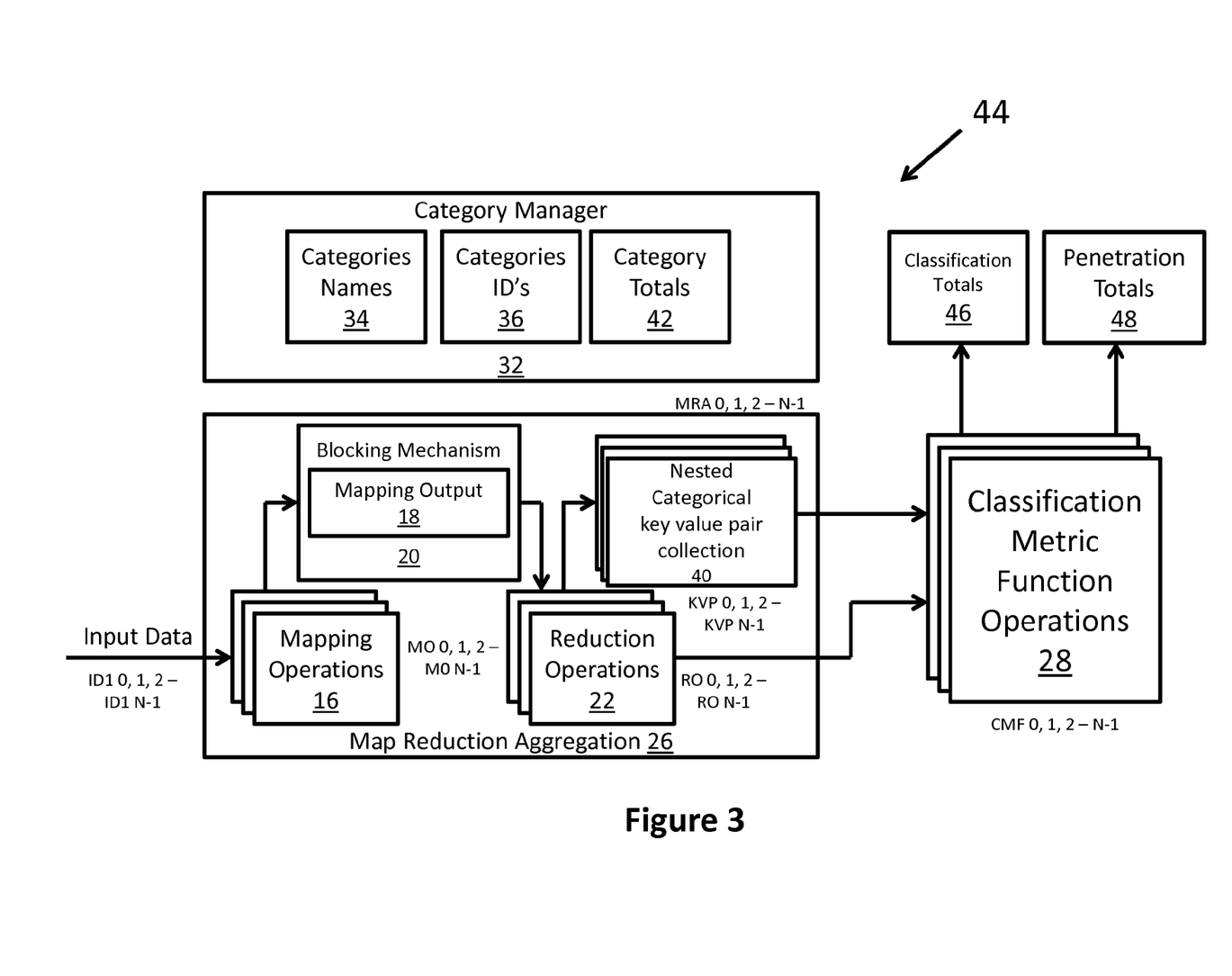
FIG. 3 illustrates a block diagram of a Collaborative Analytics Map Reduction Aggregation Consolidated Classification Model.

FIG. 3 illustrates a Collaborative Analytics Map Reduction Aggregation Consolidated Classification Model 44 that processes input data with unknown categories or classification origins for the primary purposes of associating the input data ID1 0, 1, 2-ID1 N−1 with one or more known categories or classification origins within the system. Input data is first processed using a Map Reduction Aggregation Processor 26 which includes one or more parallel Mapping Operations Modules 16 that produces transitional Mapping Outputs 18 managed by a Blocking Mechanism 20 managing both production and consumption of the transitional Mapping Outputs 18 between Mapping Operations Modules 16 and one or more parallel Reduction Operations Modules 22. The Map Reduction Aggregation Processor 26 also includes a Nested Categorical Key Value Pair Collection 40 which maintains all data previously learned within the system using similar Map Reduction Aggregation Processor 26 methods.

Within the Model 40 embodiment, one or more application specific Map Reduction Aggregation Processors 26 use one or more parallel Mapping Operation Modules 16 to consistently dissect the targeted input data into individual, independent units of transitional Mapping Outputs 18 comprising consistently mapped data keys and values that are conducive to simultaneous parallel reduction processing. A Blocking Mechanism 20 is used to regulate interactions between the transitional Mapping Output 18 producers and consumers as described in FIG. 1 above. The application specific Map Reduction Aggregation Processors 26 use one or more Reduction Operations Modules 22 to continually and simultaneously aggregate and consume the transitional Mapping Outputs 18 eliminating the matching keys and aggregating values consistent with the specified reduction operations for all matching keys which are encountered during the Reduction Operations Modules 22 processing of transitional Mapping Outputs 18.

The Nested Categorical Key Value Pair Collection 40 contains all learning outputs using similar map reduction methods in a single collection of nested key value pairs where the key for each key-value pair maps to a second or nested collection of "categorical" key-value pairs as its value. The collection of "categorical" key-value pairs for each key provides a numerical description of that key across any number of categorical keys contained in the nested "categorical" key-value pair collection. This numerical description is typically created by the reduction method during learning, and the number of nested categorical key-value pair entries can also vary between the individual mapped entries within the entire collection.

In some embodiments, the Category Manger 32 maintains a collection of Category Names 34 where each unique Category Name is assigned a unique Category ID and is keyed for fast access by the Category Name, a collection of Category IDs 36 where each unique Category ID and Category Name are keyed for fast access by Category ID, and a Category Totals Collection 42 containing classification metric totals for each existing category within the system. When the classification Reduction Operations Modules 22 outputs contain keys that currently exist in the Nested Categorical Key Value Pair Collection 40, totals for each category are typically incremented or modified consistent with the specified Classification Metric Function Operations module 28. Incremented totals during the classification process are typically stored within the Classification Totals 46 Collection.

Certain embodiments using certain classification metric functions use the Classification Totals 46 Collection and the Category Totals 42 Collection to produce a collection of Penetration Totals 48 which could represent a percentage of penetration for each Category identified during classification processing. The Classification Metric Function Operations modules 28 would typically manage creation of the Penetration Totals 48 collection during or after completion of the Map Reduction Aggregation Processor 26 Aggregation Modules 26 operations.

Figure 4:
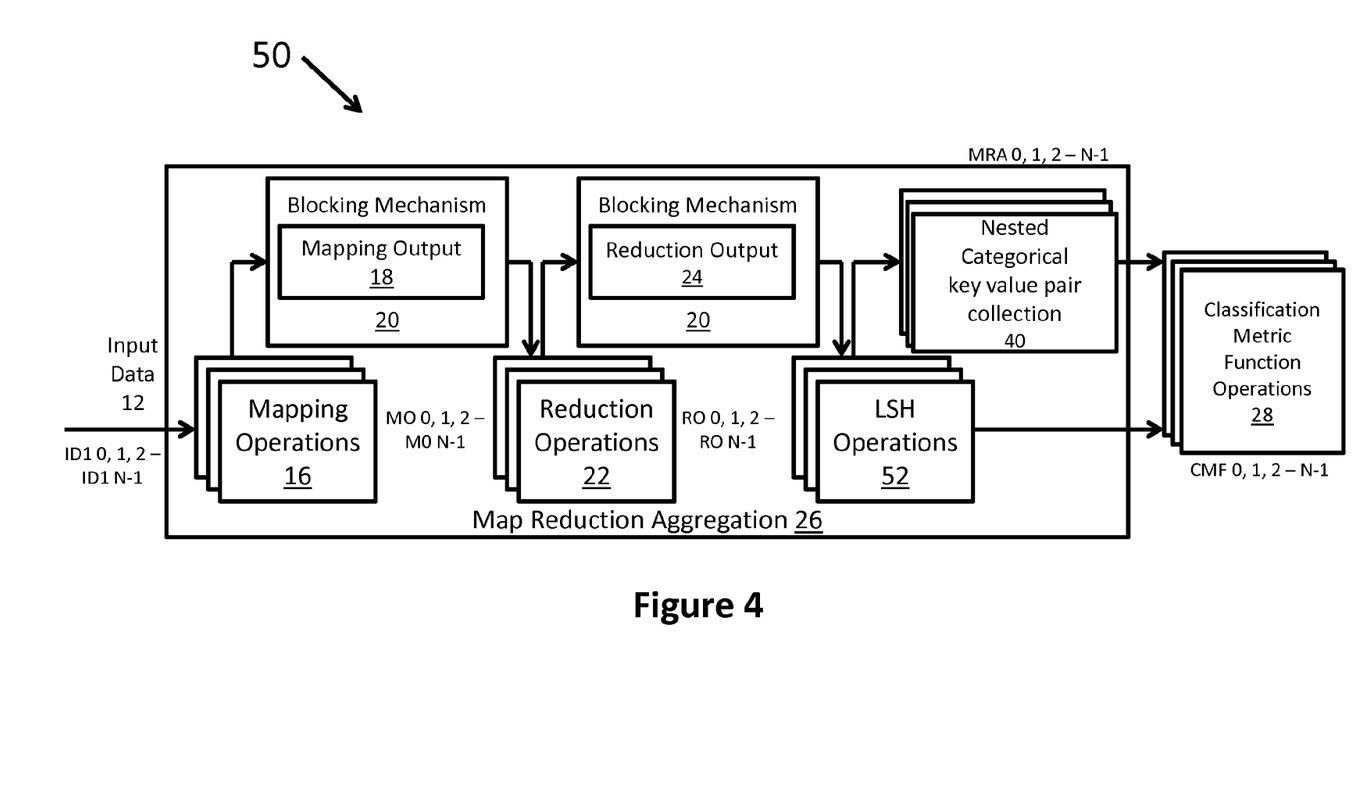
FIG. 4 illustrates a block diagram of a Map Reduction Aggregation Using Locality Sensitive Hashing.

FIG. 4 illustrates a block diagram 50 of Map Reduction Aggregation in accordance with the disclosed principles using Locality Sensitive Hashing (LSH). The LSH-based embodiment in diagram 50 includes the same Map Reduction Aggregation Processor 26 operations as described with reference to the previous figures above, with the addition of a second Blocking Mechanism 20 managing both production and consumption of the transitional Reduction Outputs 24 between Reduction Operations Modules 22 and one or more parallel Locality Sensitive Hashing (LSH) Operations Modules 52. In addition, the structure of the Nested Categorical Key Value Pair Collection 40 has been modified to store the output(s) resulting from the Locality Sensitive Hashing Operations Module(s) 52.

Certain embodiments use Locality Sensitive Hashing Operations Modules 52 to drastically reduce the amount of data stored from all application specific Reduction Operations Modules 22. One or more application specific Map Reduction Aggregation Processors 26 use one or more Mapping Operation Modules 16 to consistently dissect the targeted input data into individual, independent units of transitional Mapping Outputs 18 comprising consistently mapped data keys and values that are conducive to simultaneous parallel reduction processing. A Blocking Mechanism 20 is used to regulate interactions between the transitional Mapping Output 18 producers and consumers as described in FIG. 1 above. The application specific Map Reduction Aggregation Processors 26 use one or more Reduction Operations Modules 22 to continually and simultaneously aggregate and consume the transitional Mapping Outputs 18 eliminating the matching keys and aggregating values consistent with the specified reduction operations for all matching keys which are encountered during the Reduction Operations Modules 22 processing of transitional Mapping Outputs 18. The Reduction Operations Modules 22 place transitional Reduction Outputs 24 into a Blocking Mechanism 20 which is used to regulate interactions between the transitional Reduction Outputs 24 producers (Reduction Operations Modules 22) and consumers (LSH Operations Modules 52). The specific functions of LSH Operations Modules 52 are described in detail with reference to FIG. 5 below. For each collection of Reduction Outputs 24 produced from a specific set of input data, LSH Operations Modules 52 produce a collection of integers which represent the unique characteristics of the combined Reduction Outputs 24. The number of integers contained within the LSH Operations Modules 52 outputs for each set of input data is typically dependent on how many distinct hash functions are contained within each LSH Operations Module's 52 process.

In certain embodiments, the Nested Categorical Key Value Pair Collection 40 is modified to accommodate a consolidated output of each LSH Operations Module 52 by containing an array of Nested Categorical Key Value Pair Collections with each item representing the consolidated output of each distinct hash function contained within each LSH Operations Module 52. In one example embodiment with LSH Operations Modules 52 containing 100 distinct hash functions, Nested Categorical Key Value Pair Collection 40 may contain an array of 100 Nested Categorical Key Value Pair Collections with each individual collection representing the output from each distinct LSH Operations Module's 52 hash function. In this example embodiment, a Reduction Outputs 24 containing 100,000 unique reduction keys and values would be reduced to a collection of only 100 integer keys and values after the LSH Operations Modules 52 completed their hashing. Each of these 100 integer keys would be consolidated into the array of 100 Nested Categorical Key Value Pair Collections 40 with integer 0 going into Nested Categorical Key Value Pair Collection 0, integer 1 going into Nested Categorical Key Value Pair Collection 1, all the way to integer (LSH Distinct Hash Function Count-1) going into Nested Categorical Key Value Pair Collection (LSH Distinct Hash Function Count-1). In addition, each categorical values collection associated with each integer key would be aggregated into the 100 Nested Categorical Key Value Pair Collections 40 with its associated categories and categorical value frequencies being aggregated into the Categorical Key Value Pair Collection.

In particular embodiments using Locality Sensitive Hashing, all other processing described in previous figures remains the same once the hashing provided by the LSH Operations Modules 52 is applied to the Reduction Output 24 and stored in a slightly modified version of the Nested Categorical Key Value Pair Collections 40 as described above.

Figure 5:
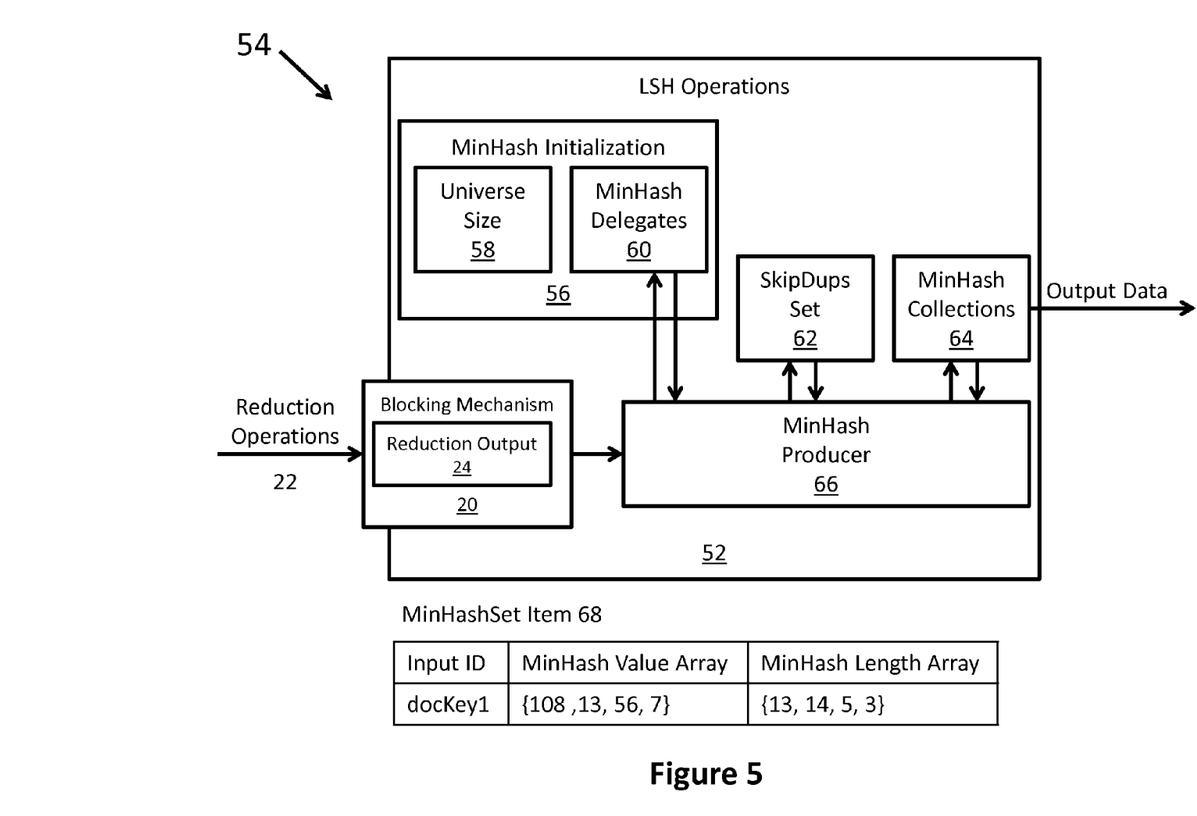
FIG. 5 illustrates a block diagram of a Locality Sensitive Hashing Operations Model.

FIG. 5 illustrates a Locality Sensitive Hashing Operations MinHash Model 54 which uses a min-hashing process during LSH Operations Modules 52 to produce a collection of integers that represent the unique characteristics of the all combined Reduction Outputs 24 for a specific set of input data. Although many variations and approaches for Locality Sensitive Hashing do exist, this particular embodiment describes the use of min-hashing to achieve a dramatic reduction in the volume of Reduction Outputs 24 by reducing all Reduction Outputs 24 for each specific set of input data to a collection of integers representing the minimum hash value for each of the distinct hash functions contained within the LSH Operations Modules 52 min-hashing process across all Reduction Outputs 24 keys which were hashed by each of the distinct min-hash functions.

The Model 54 embodiment includes a Blocking Mechanism 20 managing both production and consumption of the transitional Reduction Outputs 24 between Reduction Operations Modules 22 and Locality Sensitive Hashing Operations Modules 52, a MinHash Initialization 56 process managing the number of distinct hash functions being used for min-hashing, and a MinHash Producer 66 process which accesses the Blocking Mechanism 20 to consume all Reduction Operations Modules 22 output using the distinct hash functions created during the MinHash Initialization 56 process to repeatedly hash each Reduction Operations Modules 22 output keys retaining the minimum hash value produced by each unique hash function.

Certain embodiments use the MinHash Initialization 56 process including a Universe Size 58 and collection of MinHash Delegates 60 to set and create a predefined number of distinct hashing functions for the Locality Sensitive Hashing Operations Modules 52 process. It is imperative that the same set of distinct hashing functions be used for data processed through Locality Sensitive Hashing Operations Modules 52 during learning and subsequent classifications. For instance, if the data was learned using a set of distinct hashing functions that data should typically be classified against using the same set of distinct hashing functions during Map Reduction Aggregation Processor 26 operations. The Universe Size 58 controls the ultimate range of random numbers being selected for creating each distinct hashing function. During MinHash Initialization 56 the MinHash Delegates 60 controller creates the requested number of distinct hash functions selecting and incorporating random numbers less than the Universe Size 58 into each hash function to slightly vary the output behavior of each hash function. After MinHash Initialization 56 the MinHash Delegates 60 contains the requested number of distinct hash functions to be used during the min-hashing process.

In some embodiments, the MinHash Producer 66 uses the Blocking Mechanism 20 to continually consume Reduction Operations Modules 22 output. Each distinct set of input data contains a MinHashSet Item 68. The MinHash Producer 66 uses the MinHashSet Item 68 by hashing all Reduction Operations Modules 22 keys one time for each distinct hashing function contained in the MinHash Delegates 60 hash function collection. For example, if the Reduction Operations Modules 22 produces 1,000 unique keys and there are 100 distinct hash functions in the MinHash Delegates 60 hash function collection, then 1,000*100 hashing operations will occur. During this process certain embodiments utilize a SkipDups Set 62 to ensure that hashing operations are only performed on unique Reduction Operations Modules 22 output keys that have not already been previously hashed for a specific input data set.

Particular embodiments also utilize a MinHash Collections 64 collection in order to increase parallelism by providing the ability to process min-hashes for multiple input data sets at the same time. The MinHash Collections 64 collection maintains one unique set of all MinHash values for each distinct set of input data being processed. As all the Reduction Operations Modules 22 outputs are being consumed by the Locality Sensitive Hashing Operations Modules 52, the MinHash Producer 66 continually hashes each unique Reduction Operations Modules 22 key only saving the minimum hash value encountered for each of the distinct hash functions in the MinHash Delegates 60 hash function collection. For example, if there are 100 distinct hashing functions, there will be a collection 100 MinHash values for each input dataset once the LSH Operations Modules 52 hash completed, even if the input dataset generated 100,000 unique keys.

The MinHashSet Item 68 also demonstrates how MinHash values can be weighted by key length in certain classification metric function embodiments. In the Model 54 embodiment, the key length does not even have to be stored in the consolidated Nested Categorical Key Value Pair Collection 40 shown in FIG. 3. Once the lengths are tracked for each distinct hash function's MinHash value prior to hashing within the MinHashSet Item 68, they can be used to adjust scores accordingly. Furthermore, other embodiments could look up word values or weights prior to hashing saving only the values or weights associated with the key producing the MinHash value.

The previous descriptions, for the purposes of explanation, have been detailed with reference to specific embodiments of the invention. However, the illustrative details are not intended to be exhaustive or limit the invention in any way to only the details which have been disclosed. A myriad of changes, alterations, transformations, and modifications may be suggested to one skilled in the art, and it is intended that the present invention encompass such changes, alterations, transformations, and modifications as fall within the scope of the appended claims. The embodiments were selected and explained to best embody the principals of the invention and its practical applications, to thereby enable others skilled in the art to best utilize the invention and various embodiments with changes, alterations, transformations, and modifications as are suited to the particular use contemplated.

What is claimed is:

1. A parallel supervised machine learning system for rapidly processing volumes of input data using one or more computing devices, that are application and platform independent, participating in a distributed parallel processing environment, the system comprising:
   a plurality of parallel Map Reduction Aggregation Processors embodied in both hardware and software on the one or more computing devices, configured to receive different sets of input data for data aggregation, each of the Map Reduction Aggregation Processors comprising:
   one or more parallel Mapping Operation Modules configured to dissect the input data into individual intermediate units of mapping outputs comprising mapped data keys or key-value pairs, conducive to simultaneous parallel reduction processing, and
   one or more parallel Reduction Operation Modules configured to continually and simultaneously consume the mapping outputs by eliminating matching keys and aggregating values with a specified reduction operation for all matching keys that are encountered during consumption of the mapping outputs; and
   an application-specific Classification Metric Function Operations Module embodied in both hardware and software operating on the one or more computing devices and configured to receive reduction outputs from the Reduction Operations Modules from said consumption of each input data set's aggregated data keys or key-value pairs, and configured to determine distance and/or similarity between each of the different sets of input data and one or more data classification categories from each category's aggregated data keys or key-value pairs, wherein said one or more distance and/or similarity calculations determine the distance or similarity between one or more sets of input data and one or more classification categories.

2. A parallel supervised machine learning system in accordance with claim 1, wherein the one or more data classification categories comprise one or more parallel Nested Categorical Key Value Pair Collections consolidated from Reduction Operations Module outputs to provide key-based identifying of sets of input data.

3. A parallel supervised machine learning system in accordance with claim 2, wherein the key-based identifying is based on a category name associated with a category ID or a category ID associated with a category name.

4. A parallel supervised machine learning system in accordance with claim 3, further comprising a Category Manager comprising at least one key value pair collection of unique category names and category IDs, wherein the Map Reduction Aggregation Processors are further configured to access the Category Manager to provide the key-based identifying of input data using known category names and category IDs.

5. A parallel supervised machine learning system in accordance with claim 4, wherein the collection of categorical key value pairs for each key provides a categorical association including an optional numerical description of that key across any number of categorical keys contained in a Nested Categorical Key Value Pair Collection.

6. A parallel supervised machine learning system in accordance with claim 4, wherein the one or more Nested Categorical Key Value Pair Collections comprise all outputs using similar map reduction methods in at least one collection of nested key value pairs where the key for each key value pair maps to a nested collection of categorical key value pairs as its value.

7. A parallel supervised machine learning system in accordance with claim 4, wherein the Category Manager further comprises a Default Frequencies Collection comprising default category associations which may also include default starting frequencies for input data when Reduction Operations Module outputs contain one or more key values for input into the Nested Categorical Key Value Pair Collection.

8. A parallel supervised machine learning system in accordance with claim 7, wherein when unknown key values are encountered in Reduction Operations Module outputs during map reduction aggregation consolidation, the Default Frequencies Collection is accessed and at least one default category which may also include a default frequency for the input data being processed is used as a starting nested categorical key value pair entry collection in the new nested key value pair entry.

9. A parallel supervised machine learning system in accordance with claim 4, wherein the Classification Metric Function Operations Module is configured to use a Classification Total Collection, comprising totals for each matching category identified when the Reduction Operations Module outputs contain keys that currently exist in the Nested Categorical Key Value Pair Collection, and to use a Category Totals Collection, comprising representative totals for each category, to produce a collection of penetration totals representing a classification score for each category identified during classification processing by the Classification Metric Function Module.

10. A parallel supervised machine learning system in accordance with claim 1, further comprising a blocking mechanism configured to regulate Mapping Operations Module outputs when production capacity exceeds a predetermined production capacity threshold.

11. A parallel supervised machine learning system in accordance with claim 1, wherein each Map Reduction Aggregation Processor further comprises one or more parallel Locality Sensitive Hashing (LSH) Operations Modules, each configured to produce a collection of values representing unique characteristics of combined Reduction Operation Module outputs from a specific set of input data, wherein the number of values contained within LSH Operations Module outputs for each set of input data is based on a number of distinct hash functions performed by each LSH Operations Module.

12. A parallel supervised machine learning system in accordance with claim 11, wherein each Map Reduction Aggregation Processor further comprises a Second Blocking Mechanism configured to regulate Reduction Operations Module outputs when production capacity exceeds a predetermined production capacity threshold.

13. A parallel supervised machine learning system in accordance with claim 11, wherein the Classification Metric Function Operations Module is further configured to receive LSH Operations Module outputs for use in the determining of similarity and/or distance between the different sets of input data and categories.

14. A parallel supervised machine learning system in accordance with claim 11, further comprising one or more parallel Nested Categorical Key Value Pair Collections consolidated from Reduction Operations Module outputs to provide key-based identifying of input data by category name associated with a category ID or category ID associated with category name, wherein the one or more Nested Categorical Key Value Pair Collections are further configured to store LSH Operations Module outputs prior to receipt by the Classification Metric Function Operations Module.

15. A parallel supervised machine learning system in accordance with claim 11, wherein the one or more LSH Operations Modules are further configured to produce one or more resulting Minimum Hash (MinHash) Values for each of the distinct hash functions performed, wherein a Collection of MinHash Value represents the unique characteristics of the sets of input data.

16. A parallel supervised machine learning system in accordance with claim 15, wherein the Map Reduction Aggregation Processors are further configured to consolidate the MinHash Values by storing LSH Operations Module outputs in one or more collections of nested key value pairs where the key for each key-value pair maps to a Nested Collection of Categorical Key-Value Pairs as its value.

17. A parallel supervised machine learning system in accordance with claim 16, wherein the Nested Collection of Categorical Key-Value Pairs is partitioned based on each distinct hash function by assigning each distinct hash function a distinct hash function ID.

18. A parallel supervised machine learning system in accordance with claim 1, wherein the plurality of Map Reduction Aggregation Processors is configured to receive parallel sets of input data simultaneously.

19. A parallel supervised machine learning system in accordance with claim 1, wherein the Classification Metric Function Operations Module determines distance and/or similarity between the different sets of input data and categories using a classification metric function specified by an application programmer wherein the Classification Metric Function Operations Module receives outputs from at least one Reduction Operations Module determined from said consumption of each input data's aggregated data keys or key-value pairs, the Classification Metric Function Operations Module performing the one or more distance and/or similarity calculations to determine the distance or similarity between one or more sets of input data and one or more classification categories, and accessing a Nested Categorical Key-Value Pair Collection for retrieving aggregated data keys or key-value pairs and performing said distance and/or similarity calculations.

20. A data aggregation system in accordance with claim 19, wherein the Classification Metric Function Operations Module determine distance and/or similarity between the different sets of input data by performing multiple distance and/or similarity metric calculations consistent with the specified classification metric function.

* * * * *